United States Patent [19]

Kraus

[11] 3,848,476

[45] Nov. 19, 1974

[54] TRACTION ROLLER TRANSMISSION

[75] Inventor: Charles Edward Kraus, Austin, Tex.

[73] Assignee: Excelermatic, Inc., Leesburg, Va.

[22] Filed: June 5, 1973

[21] Appl. No.: 367,194

[52] U.S. Cl. .................................... 74/206, 74/798
[51] Int. Cl. ...................... F16h 13/02, F16h 13/06
[58] Field of Search .............. 74/206, 208, 211, 798

[56] References Cited
UNITED STATES PATENTS

| | | | |
|---|---|---|---|
| 1,106,246 | 8/1914 | Schoedelin | 74/206 |
| 2,765,665 | 10/1956 | Pickels et al. | 74/206 |
| 2,815,685 | 12/1957 | Parrett | 74/798 |
| 2,850,338 | 9/1958 | Kopczynski | 74/206 X |
| 3,380,312 | 4/1968 | Barske | 74/206 |
| 3,475,993 | 11/1969 | Hewko | 74/208 X |

Primary Examiner—Benjamin W. Wyche
Assistant Examiner—Lance W. Chandler

[57] ABSTRACT

A traction roller transmission having traction rollers arranged in the annular space between a traction ring and a sun roller disposed in the traction ring. The traction rollers are in frictional engagement with the sun roller and the traction ring for the transmission of power therebetween and have lines of contact with the traction ring which are shorter than the lines of contact with the sun roller.

12 Claims, 2 Drawing Figures

PATENTED NOV 19 1974 3,848,476

3,848,476

TRACTION ROLLER TRANSMISSION

BACKGROUND OF THE INVENTION

1. Field of the Invention

The invention relates to fixed-ratio traction roller transmissions, in which a traction roller is in contact with at least two other traction surfaces having different radii of curvature.

2. Description of the Prior Art

Traction roller transmissions in which one roller is in contact with at least two other rollers or traction rings are disclosed for example in U.S. Pat. Nos. 771,541 and 3,380,312, and this applicant's earlier application Ser. No. 269,531 filed July 7, 1972. In the arrangements described in these references, a number of traction rollers are arranged in the annular space between a traction ring and a sun roller disposed in the traction ring for the transmission of motion between the sun roller and the traction ring. It has been found that the life of the traction ring by far exceeds the life of the sun and traction rollers because, during operation of these transmissions, the rotational speed of the traction ring is substantially lower than that of the sun roller and that of the traction rollers and, furthermore, the difference in curvature between the traction ring surface and the traction roller surfaces is substantially smaller than the difference in curvature between the traction roller surfaces and the sun roller surface.

It is particularly the relatively small difference in curvature between the surfaces of the traction ring and those of traction rollers which causes the surface pressure between the traction ring and the traction rollers to be substantially smaller than that between the traction rollers and the sun roller. If slippage occurs, it occurs therefore between the traction ring and the traction rollers. However, the contact forces between the traction ring and the traction rollers are maintained sufficiently large to avoid slippage. But the same contact forces have to be taken up by the contact areas between the traction rollers and the sun roller where they cause extremely large specific surface pressures thereby reducing the life of the sun and the traction rollers.

SUMMARY OF THE INVENTION

In a traction roller transmission, traction rollers are arranged in the space between, and in frictional engagement with, a traction ring and a sun roller disposed within the traction ring. The traction rollers are in engagement with the sun roller along a first line of contact and in engagement with the traction ring along a second line of contact which is shorter than the first line of contact to provide essentially the same specific contact pressure on the traction ring and sun roller surfaces.

DESCRIPTION OF THE PREFERRED EMBODIMENT

Figure 1:
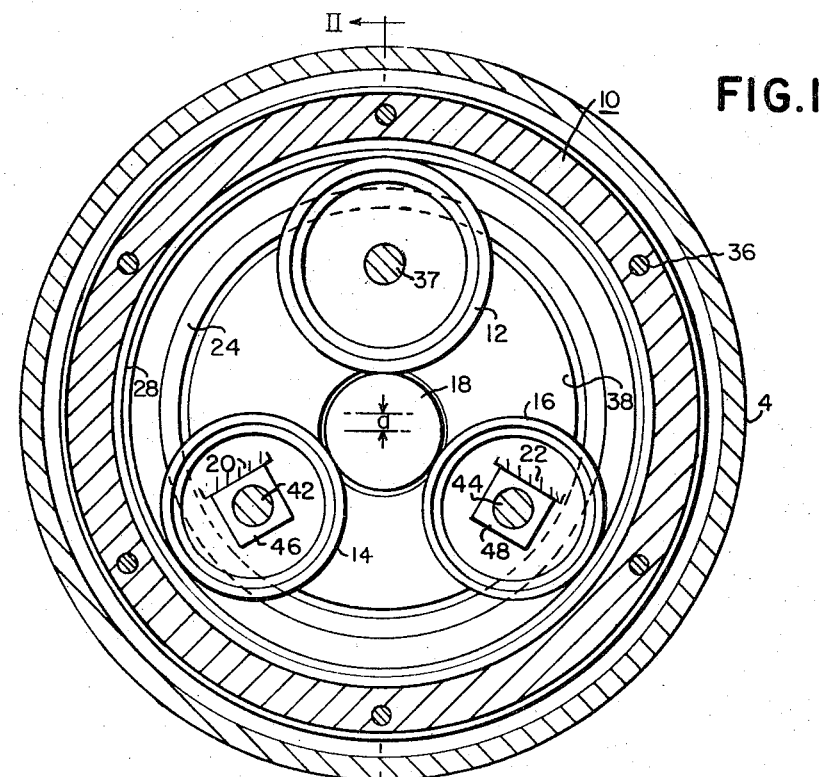
FIG. 1 shows schematically the transmission for the explanation of its operation.

FIG. 1 shows generally a transmission arrangement in which a traction ring 10 carried by a shaft 2 supported within a housing 4 by a bearing 6 surrounds three traction rollers 12, 14, 16 engaging therebetween a sun roller 18 for the transmission of power between the traction ring 10 and the sun roller 18. The sun roller 18 is connected to, or is, the end of an input shaft and the traction ring 10 is mounted on an output shaft 2 if the transmission is used as a speed reducer. The axes of the sun roller 18 and the traction ring 10 are parallel to, but displaced from, each other by a distance $a$ so that, between the traction ring 10 and the sun roller 18, an annular path of varying width is formed. The roller 12 is disposed in the widest path area and the rollers 14 and 16 are disposed in the narrowing path areas. Both rollers 14 and 16 are free to move into the narrowing path but their movement out of the narrowing path is restricted by abutments 20 and 22 for example of the type as described in U.S. Pat. No. 3,380,312 or in this applicant's earlier application Ser. No. 269,531, filed July 7, 1972, now Pat. No. 3,776,051. As explained in this application, such arrangement forces all the traction rollers 12, 14, 16 into firm engagement with the sun roller 18 and the traction ring 10 for the transmission of motion between the sun roller 18 and the traction ring 10.

The traction ring 10 is provided with guide rails 24, 26 for guiding the traction rollers into alignment with the traction ring 10 as described in applicant's copending application Ser. No. 366,068. The traction ring 10 includes two race rings 28 and 30 disposed adjacent the axially outer ends of the traction rollers such that an annular groove 32 is formed in the center of the traction ring 10, the traction rollers being in contact with the traction ring 10 only at the radially inner surfaces of the race rings 28 and 30.

Figure 2:
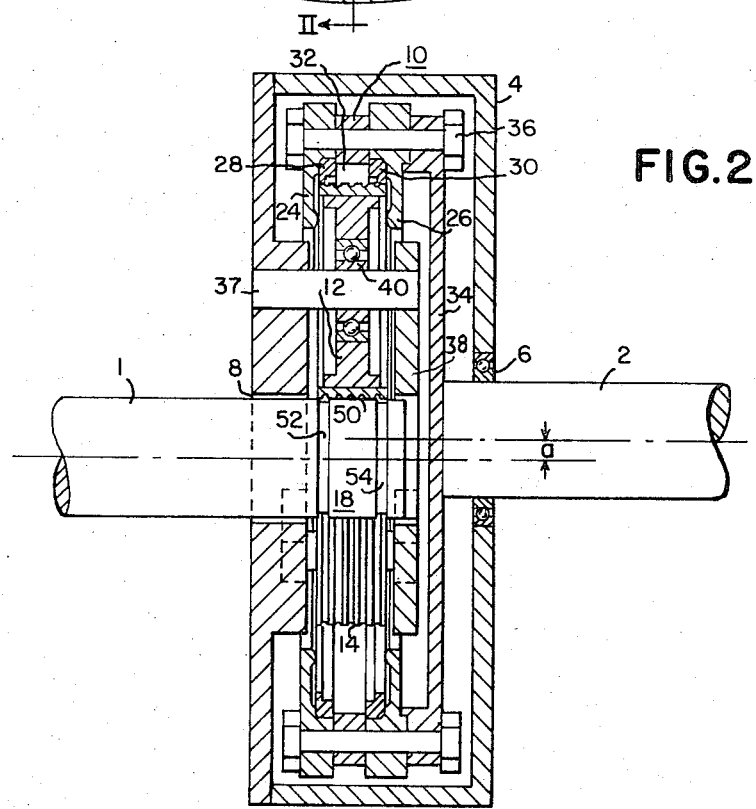
FIG. 2 is a cross-sectional view along lines II—II of FIG. 1 showing the arrangement according to the invention.

As indicated in FIG. 2, the traction ring 10 consists preferably of separate ring sections held together and mounted on a disc 34 as by bolts 36, the disc 34 being supported by the output shaft 2. This arrangement permits the use of the most suitable materials for the function for which each section is designed. It also permits selection of the race width simply by selecting different race rings 28, 30.

The roller 12 is supported by a bearing 40 on a shaft 37 mounted at one end in the housing 4 and, at the other end in a support plate 38 mounted in the housing 4 in spaced relationship therefrom. The other traction rollers 14 and 16 are similarly mounted on shafts 42 and 44 which carry abutment blocks 46 and 48.

All traction rollers 12, 14, 16 have circumferential grooves 50 adapted to receive lubricant escaping from the contact areas of the race ring and roller surfaces.

As shown in FIG. 2, the sun roller 18 is formed by the end portion of an input shaft 1 which extends into the housing 4 through an opening 8. It has annular grooves 52 and 54 formed therein adjacent the axially outer ends of the traction rollers in order to limit the contact area between the traction rollers and the sun roller to raise the portion between the grooves 52 and 54, Preferably, the race rings 28 and 30 not wider than and arranged in alignment with the grooves 52 and 54 so that the sun roller 18 and the race rings 28 and 30 are in contact with different areas of the traction rollers 12, 14, 16. However, the area or the length of the lines of contact of the traction rollers with the sun rollers is substantially longer than their lines of contact with the traction ring. The smaller the sun roller, that is, the larger the transmission ratio of the transmission, the longer is the line of contact between sun roller and traction rollers as compared to the lines of contact between traction ring and traction rollers.

The arrangement according to the present invention permits the selection of the contact forces between traction ring and traction rollers and traction rollers and sun rollers such that essentially the same specific surface pressure is obtained and that the sun roller and the traction ring have a similar life expectancy.

It has been found that the length of the line of contact of the traction rollers with the traction ring is preferably in a relationship to the length of the lines of contact of the traction rollers with the sun roller which corresponds to the transmission ratio that is:

$$\frac{\text{length of line of contact of the sun roller}}{\text{length of line of contact of the traction ring}} \sim \text{transmission ratio}$$

For technical reasons, however, it is preferred that the line of contact of the traction ring with the traction rollers be about 20% longer than in the above formula. Preferably, the relationship between the lengths of the lines of contact between the traction ring and the traction roller and between the sun roller and the traction ring is about as follows:

| Transmission ratio | 2:1 | 3:1 | 4:1 | 6:1 | 8:1 |
| --- | --- | --- | --- | --- | --- |
| Approximate length of contact of traction ring in % of length of contact of sun roller | 60 | 40 | 30 | 20 | 15 |

With the arrangement according to the presnt invention, the contact pressure between the sun roller and the traction rollers can be reduced without risk of slippage between the traction rollers and the traction ring. Accordingly, the life of the traction rollers and, particularly, the sun roller is greatly increased. It will, furthermore, be appreciated that also the rolling resistance and the drag as caused by the lubricant on the race ring surfaces are substantially reduced.

I claim:

1. A traction roller transmission comprising a rotatable means having a circular race; a first roller having a circumferential race and being disposed relative to said rotatable means such that a space is formed between the races of the rotatable means and the first roller, and at least one motion transmitting traction roller rotatably supported in said space with its circumferential face in frictional engagement with the circumferential race of said first roller along a first line of contact and with the circular race of said rotatable means along a second line of contact for transmitting motion between the first roller and the rotatable means, said circumferential face and said circumferential race having a difference in curvature which is larger than the difference in curvature between said circumferential face and said circular race, and said second line of contact being shorter than said first line of contact.

2. A traction roller transmission as recited in claim 1, wherein said circular race is the inner surface of a traction ring having a race area of a width smaller than the width of the traction rollers.

3. A traction roller transmission as recited in claim 2, wherein an annular groove is formed centrally in the traction ring to divide the inner surface of the traction ring into two spaced races in contact with axially outer areas of the traction rollers.

4. A traction roller transmission as recited in claim 3, wherein said two spaced races are formed by two spaced race rings forming part of said traction ring.

5. A traction roller transmission as recited in claim 3, wherein said first roller has annular grooves formed in the areas adjacent those areas of the traction rollers which are in contact with the traction ring races such that the first roller surface and the traction ring races are in contact with different areas of the traction rollers.

6. A traction roller transmission comprising input nd output shafts; a traction ring associated with one of said shafts for rotation therewith; a sun roller carried by the other of said shafts and disposed within said traction ring with its axis parallel to, but displaced from, the axis of said traction ring thereby to form an annular path of varying radial width between the sun roller and the traction ring; and a number of motion transmistting traction rollers disposed in said annular path in annularly spaced relationship, at least one of said rollers being free to be pulled into a narrowing section of said annular path to cause firm engagement of said traction rollers with said sun roller and said traction ring, said traction rollers being in engagement with said sun roller along first lines of contact and with said traction ring along second lines of contact which are shorter than said first lines of contact.

7. A traction roller transmission as recited in claim 6, wherein said traction ring has an annular race area of a width smaller than the width of the traction rollers.

8. A traction roller transmission as recited in claim 6, wherein an annular groove is formed centrally in the traction ring to divide the inner surface of the traction ring into two spaced races in contact with axially outer areas of the traction rollers.

9. A traction roller transmission as recited in claim 8, wherein said two spaced races are formed by two spaced race rings forming part of said traction ring.

10. A traction roller transmission as recited in claim 6, wherein said sun roller has annular grooves formed in the areas adjacent those areas of traction rollers which are in contact with the traction ring races such that the sun roller surface and the traction ring races are in contact with different areas of the traction rollers.

11. A traction roller transmission as recited in claim 6, wherein said second line of contact is at least as long as said first line of contact divided by the transmission ratio.

12. A traction roller transmission as recited in claim 11, wherein the length of said second line of contact is about 120 percent of said first line of contact divided by the transmission ratio.

* * * * *